(12) United States Patent
Fontijn et al.

(10) Patent No.: US 7,574,515 B2
(45) Date of Patent: Aug. 11, 2009

(54) PEER TO PEER TRANSFER OF CONTENT

(75) Inventors: Wilhelmus Franciscus Johannes Fontijn, Eindhoven (NL); Nicolaas Lambert, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 648 days.

(21) Appl. No.: 10/553,549

(22) PCT Filed: Apr. 22, 2004

(86) PCT No.: PCT/IB2004/050491

§ 371 (c)(1), (2), (4) Date: Oct. 19, 2005

(87) PCT Pub. No.: WO2004/094980

PCT Pub. Date: Nov. 4, 2004

(65) Prior Publication Data

US 2007/0005797 A1   Jan. 4, 2007

(30) Foreign Application Priority Data

Apr. 24, 2003   (EP)   ................... 03101131

(51) Int. Cl.
*G06F 15/16*   (2006.01)

(52) U.S. Cl. .................. 709/232; 709/203; 709/218
(58) Field of Classification Search ............... 709/203, 709/232, 218
See application file for complete search history.

(56) References Cited

U.S. PATENT DOCUMENTS

2002/0062290 A1   5/2002   Ricci
(Continued)

FOREIGN PATENT DOCUMENTS

EP   1220173 A1   7/2002
(Continued)

OTHER PUBLICATIONS

Gong Project JXTA: A Technology Overview pp. 1-16, 2001.*
(Continued)

*Primary Examiner*—Larry D Donaghue

(57) ABSTRACT

This invention relates to a method, a device, a server and a system of/for peer to peer transfer of content. Said method includes the steps of receiving and transmitting, from a first device (11), a first request with a first selection criterion for a first content to a server (18) or to a second device (12); transferring the first content satisfying said first selection criterion to said first device from the server, when said server previously has acknowledged said first device as a legal recipient of said first content and in case said first content is available only on said server, and noting that said first device subsequently has the requested first content available for other devices (14, 15, 16, 17); or re-directing said first request to a third device (13) on which the server knows that the requested first content is still available and transferring said first content satisfying said first selection criterion to said first device from the third device; or transferring the first content satisfying said first selection criterion to said first device from the second device, when said first content is available on said second device, and informing the server that said first content has been transferred to said first device from said second device; and rewarding the one of said second or third device from which said first content was transferred to said first device, when content was transferred from one of these; and charging said first device for reception of said first content. This enables for download, upload and sharing of legally protected paid-for content.

12 Claims, 2 Drawing Sheets

U.S. PATENT DOCUMENTS

Figure 1:
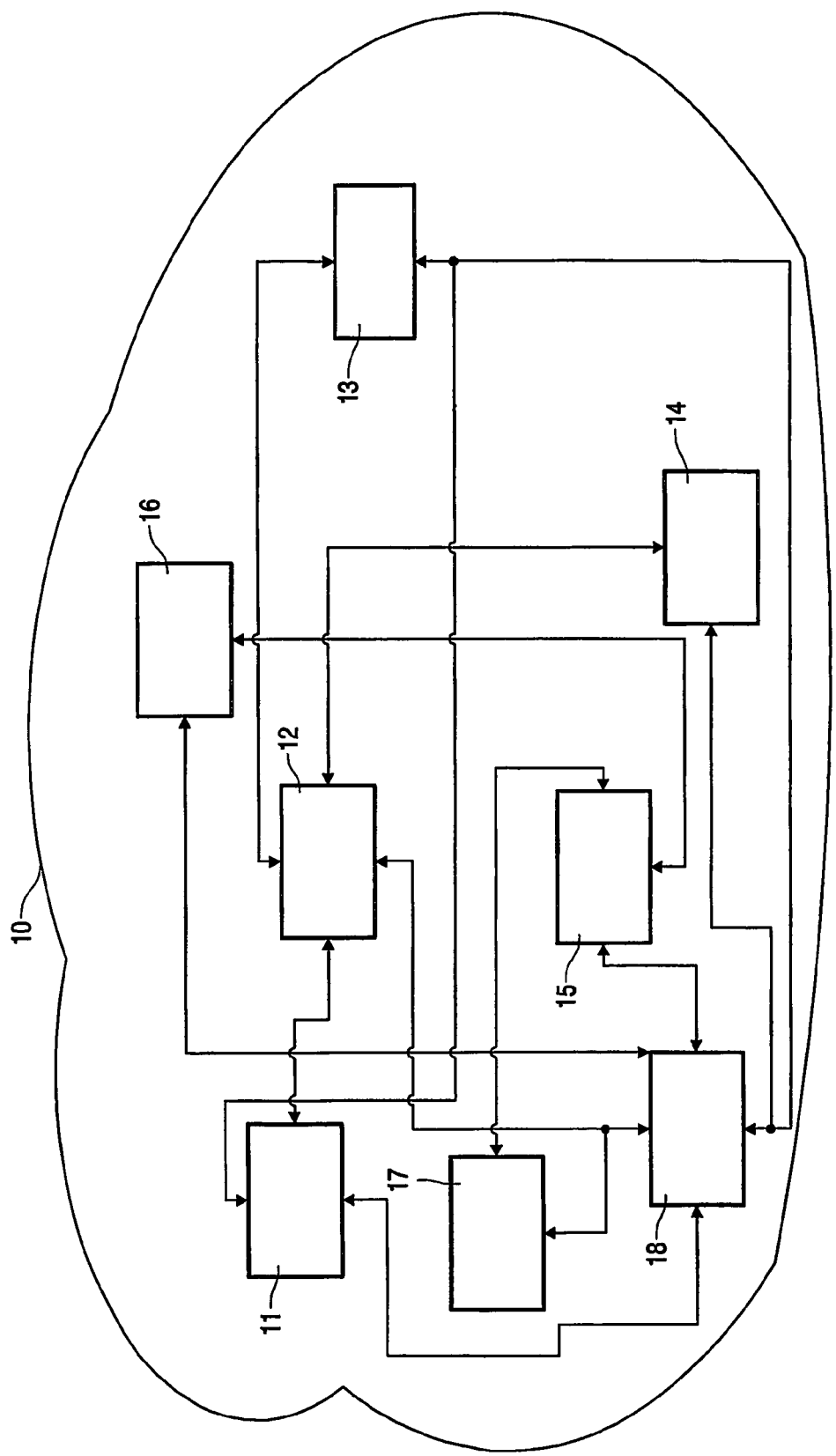

| | | |
|---|---|---|
| 2002/0087885 A1* | 7/2002 | Peled et al. .................. 713/201 |
| 2003/0002521 A1 | 1/2003 | Abdelaziz et al. |
| 2003/0131353 A1* | 7/2003 | Blom et al. ................... 725/25 |
| 2005/0071496 A1* | 3/2005 | Singal et al. ................ 709/232 |

FOREIGN PATENT DOCUMENTS

| | | |
|---|---|---|
| EP | 1229443 A2 | 8/2002 |
| EP | 1229443 B1 | 8/2002 |
| EP | 1255416 A1 | 11/2002 |
| EP | 1271970 A1 | 1/2003 |
| GB | 2377042 A | 12/2002 |
| WO | 0193064 A1 | 12/2001 |
| WO | 02078284 A2 | 10/2002 |

OTHER PUBLICATIONS

Gong JXTA: A Network Programing Environment pp. 1-8, Jun. 2001.*

Written Opinion of the International Searching Authority PCT/IB2004/050491.

ISR, International Search Report No. WO2004/094980A3.

* cited by examiner

PEER TO PEER TRANSFER OF CONTENT

This invention relates to a method of peer to peer transfer of content.

The present invention also relates to a computer system for performing the method.

The present invention further relates to a computer program product for performing the method.

This invention further relates to a device on which parts of said method is executed.

This invention further relates to a server on which remaining parts (not run on the device) of said method is executed.

This invention further relates to a system on which said method is executed.

EP 1229443 discloses a system and a method for providing advertisements in a peer to peer networking environment. Each of the advertisements is defined as a structured, language neutral metadata structure. This is used to name, describe and publish an existence of a peer to peer platform resource, such as the peer itself, a pipe or a service. The advertisements are subsequently available to other peers in the networking environment.

From the art it is known that Peer-to-peer is a communications model in which each party (i.e. each peer) has the same capabilities and either party can initiate a communication session. Other models with which the pure Peer-to-peer communications model might be contrasted include the client/server model and the master/slave model, both also known in the art. In some cases, peer-to-peer communications is implemented by giving each communication node both server and client capabilities. In recent usage, peer-to-peer has come to describe applications in which users can use the Internet to download or upload multimedia content or simpler content in form of files with and to each other directly or through a mediating server.

On the Internet, peer-to-peer (referred to as P2P) is a type of transient Internet network that allows a group of computer users (peers) with the same networking program to connect with each other and directly access files from one another's hard drives. Napster and Gnutella are examples of this kind of peer-to-peer software.

When the Internet P2P is applied, it is known in the art that the user must first download and execute a peer-to-peer networking program, e.g. Gnutella-net is currently one of the most popular of these decentralized P2P programs because it allows users to exchange all types of files.

As discussed later, it is a problem that the files may represent a stolen property right, such as music, a movie, etc, and/or the files may have a poor quality and/or said files may contain virus.

After launching the program, the user enters the IP address of another computer belonging to the network, typically, the Web page where the user obtained the download will list several IP addresses as places to begin. Once the computer finds another network member on-line, it will connect to that user's connection, which has obtained their IP address from a connection of another user, and so on.

It is however, a problem especially for unexperienced, unaware users that downloadable content typically available in a peer-to-peer network may be legally protected and thus it is illegal do download it and use it, i.e. play back or view said content. In other words, many users—except for the few who know they are deliberately infringing rights of the owner of copy protected content when downloaded—prefer to apply a method and device where they are secure that downloaded content is legal so that they subsequently can play back or view being sure that no rightful proprietor (of said content) is being infringed.

It is a further problem for users that downloadable available ('for-free' (in fact stolen from a legal point of view) content can contain virus, i.e. when said content is subsequently played back or viewed on the user's device, the virus may also get life, i.e. it may be executed simultaneous with the playing back or viewing of content on the user's device. Said virus can then consequently harm the file or operating system of the device of the user thus making the user device malfunction or lose previously downloaded content as well.

It is a further problem for users that downloadable available 'for-free' content may be in a poor quality, since the content is illegal recorded during a concert, in a cinema or recorded from the original content by means of poor quality recording equipment, thus content in this case is in fact illegal obtained and in a poor quality.

In other words, it is a problem that user are uncomfortable with 'for-free' content since it may contain virus and/or make the user a thief, if the unaware user downloads such content.

Additionally, it is a problem that users are reluctant in sharing (i.e. transmitting to others) copy protected content since they risk being caught in infringement of the rightful proprietor, if sharing, especially when using Web-pages (to download content) not telling that eventually provided material (content) from a legal point of view is in fact a violation of copyright laws.

It is a further problem that currently the real cost of a downloaded item of content is not transparent to the user.

The present invention enables users to download legally protected content when applying the method according to the invention and/or when using the device according to the invention which communicates with the server in the peer-to-peer network. Subsequently, it is legal to play it back, view it and share it with others. This is possible, since the method (and the device and server applying the method) handles the property rights and the payments in a legal manner, which both the users and content providers are comfortable with, i.e. the user is assured that he does not make a thief out of himself, and the content providers (artist, singer, movie manufacturer, etc) are assured that their content is not being stolen, but paid for.

Further, it is assured that the downloaded content is virus-free and in an approved quality.

Additionally, users can—when applying the method by means of their device—easily and legally share (i.e. transmit to others) copy protected content since some steps of the methods ensure that the proprietor of content gets paid for his content, since users are charged for downloads. Further, users (of said devices), themselves can obtain a reward for sharing, this further expands sharing.

Further, it is an advantage of the invention that the real cost of a downloaded item of content is transparent to the user.

Said device and server, in combination and the system provide the same advantages and solve the same problem(s) for the same reasons as described previously in relation to the method.

Figure 2:
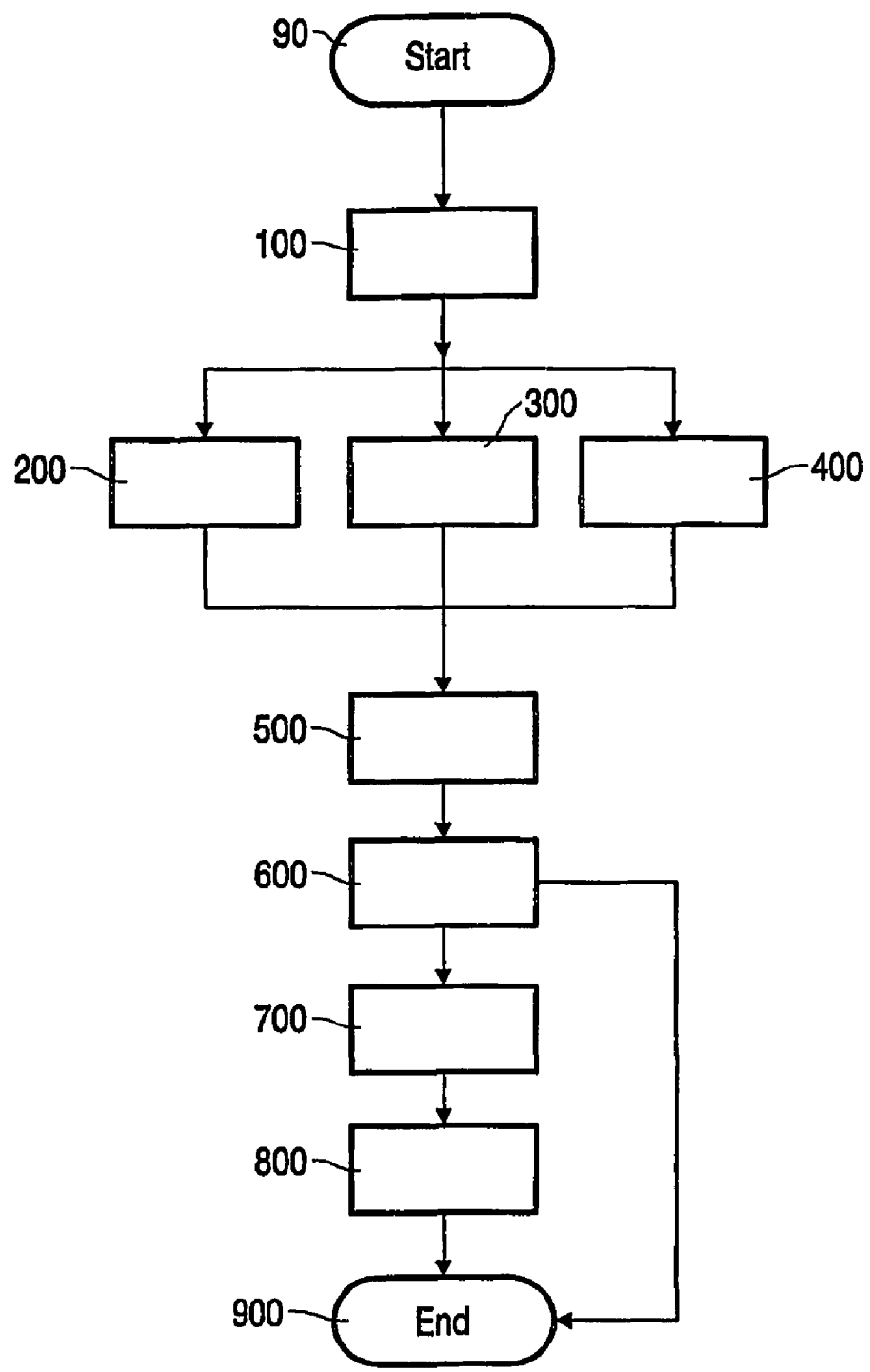

The invention will be explained more fully below in connection with preferred embodiments and with reference to the drawings, in which:

FIG. 1 shows a network of devices and a server; and
FIG. 2 shows a method of peer to peer transfer of content.

Throughout the drawings, the same reference numerals indicate similar or corresponding features, functions, etc.

FIG. 1 shows a network of devices and a server. Said network of devices with the server are illustrated by means of reference numeral 10. As will be explained more detailed in the next figure, a first device, reference numeral 11, or its user is looking for certain content (a video film as an example), the user will then try to find out from where the video film can be obtained, i.e. downloaded. He will use a specific selection criterion for the video film content. In technical terms, his device (first device) will receive the selection criterion e.g. movie name, genre, etc, which it then will send to another device (a second device. reference numeral 12,)) and to a server, reference numeral 18, since his own device (said first device) cannot know whether the server or another peer to peer device, has the requested content available. If the server has the content satisfying the selection criterion, it will provide it to the requesting device, i.e. to said first device. However, in order to offload and distribute network usage more efficient—if the server knows that another peer (device) has the requested content available, the server will redirect the transfer of content to this device which then will provide the content satisfying the selection criterion, i.e. transfer it to the requesting device equalling said first device. In the last case, the server is informed—by the actual device transferring content that content has been transferred to said first device, which then can be accordingly charged for receiving the requested content. Hereby, the first device (and its user) is comfortable with content charged for, since it is virus free and has been legally bought, i.e. the user is sure that he did not make a thief out of himself; further the user can rely on that the content has an approved quality level, since it comes form the legal owner or an administrator of network, he can trust.

In the first case, i.e. the server supplied directly the requested content, the server typically previously acknowledged that said first device is in fact a subscribing or paying (or one who later will pay) rightful recipient of the content, i.e. said video film. The content, in general, can be uploaded to or downloaded from more devices, e.g. reference numerals 13 and 14. In the network further devices may be present, e.g. reference numerals 15, 16 and 17. Generally, the server has to be accessible to and in the network of devices, i.e. to all devices, either for transfer of content the first time, and/ or subsequently for charging and rewarding, this is illustrated by means of the arrows connecting the server to the devices.

A requester needs not register or be registered to the server. There may be a third party that certifies the requester to the server. The server trusts the certifier and assumes the requester is allowed to receive. Or the requester pays 'on-the-spot' using virtual tokens or a mediation service (Pay-Pal).

The network is shown for illustrative purposes, any other dynamic or static topology or arrangement of peers or devices and one or more additionally servers may also be applied in the present invention.

Any of said devices may be a video cassette recorder (VCR), a personal digital assistant (PDA), a mobile phone, a television, a radio, a DVD player, a CD player, an information panel, a web tablet, a smart remote, a peer or a personal computer.

The device alternatives as mentioned may be understood as corresponding peers in a peer-to-peer type of transient network similar to the type found on the Internet, that allows a group of computer users (with access to their corresponding peers or devices) with the same or similar networking program or protocol to connect with each other and directly access content, e.g. in the form of files, etc to/from one another's hard drives, memories, etc.

A peer-to-peer network is simply a network of peers, the Internet, Gnutella software, computers are all just examples of aspects of specific implementations, however the present invention applies said server for rewarding direct peer to peer content sharing, and said server is furthermore applied to charge peers for download of content. Since content typically is copy protected content, at least one of said servers tracks, charges and rewards peers (devices) for down and upload, respectively of copy protected content.

In a preferred embodiment of the invention said content comprises one or more selected from the group:
- a DVD picture and sound signal;
- a CD sound signal;
- a given digital audio format (e.g. MP3, WMA, Real Audio, WAV, etc);
- a given digital movie format (e.g. DivX, DVD/MPEG2, Avi, wmf, MOV, Real Video, etc);
- a given picture format (e.g. JPEG, GIF, BMP, TIFF, etc); and/or
- any such format that is capable of causing the device to emit a picture and/or sound signal, e.g. G72x, aiff, real.

This is possible since said device can be a CD player, a DVD player, a radio, a mobile phone, etc. as discussed, accordingly content can be presented, i.e. shown and/or played back on said device.

In other words, the above content combinations are copy protected content, which, generally, are in the form of numerical, textual information, picture, video, sound and/or any combination(s) thereof, and which, generally, also are being free from virus and in an approved quality.

FIG. 2 shows a method of peer to peer transfer of content. The content is transferred among device in the peer to peer network, in initial situations, i.e. the first times content gets available, by means of the server.

Prior to the following steps, it is assumed that—as a starting point—that only the server can provide content; later on content can be distributed (or spread) to various devices (second, third, etc,) i.e. at later occasions these devices can provide content without directly involving the server, however, still devices requesting and receiving content are charged accordingly regardless from where (i.e. from the server or from the peer to peer device) said content is being transferred.

Further, content is copy protected content, i.e. legal content being free from virus and in an approved quality. The server is in all cases—also when content is transferred directly between devices—responsible for that the copy protected content is legal, free from virus and in the proper quality, this is possible since—from the starting point—content can only be introduced into the network via the server. The actual (content) data does not have to originate from the server. The server just needs to certify it. Any user may offer a piece of content to the server for certification. On the server side the content will be checked and when it is found to be acceptable, the content is certified, for download, redirection, etc. In step 100, a first request may be received on a first device. The request typically comprises a first selection criterion for a first content, the user of the first device can e.g. key in his selection criterion for the content by means of a keyboard or by means of any common user interface know in the art, e.g. a GUI like windows, soft-keys, menu driven, click by means of a mouse, etc. The content may reside on the server and/or another second device, i.e. said second device. Therefore, subsequently the request is transmitted from the first device to the server or to said second device, since said first device cannot know whether the server or another peer to peer (second) device has said requested first content available.

Said first selection criterion may be composed by means of one or more combinable items, e.g. program, channel, Website, genre, type, topic, style, start, duration, language, title, name, hyperlink including content reference, etc.

Said first selection criterion can then be helpful for the user and to the device from which content is requested, i.e. helpful to find and subsequently transmit content having the first selection criterion, i.e. said selection criterion in general may reflect content interest(s) of a specific user, the user can therefore avoid to surf through many available channels if the device is a TV, or surf through many Web sites if his device is an Internet PC or accessed via a server from a client PC in order to find his content. The user can apply this step instead.

Said selection criterion can therefore be understood as the users own profile of interests.

As discussed, the request is transmitted to the server or to another, i.e. the second device; in general, requests are put to the network (of devices or peers) as a whole including the server(s) as stated in this step. Although, due to the nature of the network, the requests will not reach all peers in the network, they should reach at least one server, e.g. via a Kazaa like super-node that is or knows a server. In the beginning the server will only have the content available and participate in transferring the content to the requester, here said first device. If a certain number of peers have downloaded the content, the server may stop offering it because it will be available from elsewhere, i.e. from said number of peers. This is in fact dealt with by means of steps 200, 300 and 400.

In step 200, the first content satisfying said first selection criterion may be transferred to said first device from the server. This is only in the case when said server previously has acknowledged said first device as a legal recipient of said first content, e.g. through an eventually registration, and when said first content is available only on said server.

Subsequently, the server will note that said first device now has the requested first content available for the other devices. This implies that if the same request (for content) arrives again to the server, the first device will then be the direct content supplier instead of the server. The latter—in fact redirecting of content—is dealt with in step 300.

Alternatively, instead of step 200, in step 300, said first request is redirected to a third device. Said third device is known to the server as a device in fact still having the requested first content. Subsequently, said first content satisfying said first selection criterion is transferred to said first device from the device re-directed to, i.e. from said third device.

The server will currently check that said content in fact still is on the third device, in case the user of the third device removes or removed the particular content, the server will subsequently find out. In that case, the server must provide content it self or redirect the request (for content) to another fourth device (in place of said third device). In other words, the server currently checks that content is in fact still available on said third device, and that said third device is on line, if not, the request is redirected to another, i.e. to said fourth device, etc.

Alternatively, instead of step 200 or step 300, in step 400, first content satisfying said first selection criterion is transferred to said first device from the second device. This is only the case when said first content is in fact available on said second device; in that case the server is subsequently informed (by said second device) that said first content has actually been transferred to said first device. The reason for doing the latter is to enable the server to charge said first device for receiving content, in fact requested by it self. Conversely—as in next step—to enable the server to reward said second device for transferring (and sharing) content.

It is assumed that when any device (second or third) provides or supplies content, the content, in all cases, initially came from the server or is at least approved from the server to legally be available from the other device(s) (second or third) for an eventually subsequent transfer. At later occasions, one of the other devices (second or third) devices can provide content (originally legally approved by the server, etc) to even more devices. Further, after reception of content on the first device, this also can play the role of 'content provider', i.e. acting in the same manner as said second and third devices; in fact when more devices have received the same content (satisfying the same criterion) any of these—of course—play the role of 'content provider' in competition with other devices having the same content, this lowers the waiting time for a requesting device and provides for an improvement in sharing of content among devices, this in turn also offloads the server.

Generally, in step 200, 300 and 400, the server, the third device and the second device, respectively transferred content to said first device.

In step 500, said second or third device, which in fact transferred content to said first device, is then rewarded. However, it may be the case that the server transferred content itself; in this case none, i.e. neither the second nor the third device are rewarded. However, in the general case, the second or third device is rewarded; conversely, the more rare case, i.e. the server transferred content, it will not reward itself, but it may note the transfer primarily for statistical purposes.

In all cases, regardless from where (server, second or third device) content was transferred, i.e. in step 600, said first device is charged for reception of said first content. The charge may be dependent of a subscription fee or subscription agreements in general or on a per transfer basis (download); it may be dependent on a file length, value or duration, and/or combinations thereof. This is possible since content may be transferred embedded in or by means of said file.

Optionally, said method comprises the following two steps, which deals with the opposite situation, i.e. the server receives content:

In step 700, a second content satisfying a second selection criterion and the second selection criterion are uploaded to the server from a fourth device. The server should then subsequently ensure that said second content is free for virus, has the right quality level (sufficient high sampling rate, low noise, stereo, aliasing, etc) and, most importantly, is legal, for the latter the owner of the server may have agreed contracts (e.g. through license, partly or in whole, an exclusive right, etc) with the original creator, owner or supplier of content to ensure that it can be legally distributed afterwards as discussed in the steps above. The second selection criterion is uploaded with the corresponding second content in order to make said second content searchable again, when requested as discussed in step 100. The second selection criterion will be of the same nature and structure as that of said first selection criterion.

In step 800, the fourth device is rewarded. The reward is given to the fourth device in return for uploading said second content (with the second selection criterion) to the server. The reward may be given in form of credits, rebate, discounts, etc. The reward can then be used by said fourth device, if it later obtains a third content, etc.

Generally when the device is denoted first, second, etc device, it is to be understood that any device can perform the mentioned tasks, i.e. even though a first device, only as disclosed in the above steps requests content, it—as well as the other devices—may perform any task as reflected in the steps above.

Rewards, credits, rebate, discounts, the task of charging are generally dealt with by the server, i.e. the server keeps a balance of in and outgoing payments for each device up and downloading content.

As discussed above, for or each item of content the device has to pay a small fee. When a device is charged, a subsequent payment can be done on a transaction basis or included in telecommunication fees. The latter can be in the form of an elevated rate (price/minute) for the transfer or included in a periodic bill. Subscription is also an option. Part of the fee is direct payment to the content provider, which may be represented by said server. Part of the fee is used to award a discount to the device offering the content. I.e. users of devices can recap part of that fee by sharing desirable content.

For each piece of content that is downloaded from a device (to the server or to another device), the device is rewarded with credits. These credits can be in the form of rebates on the purchase of new songs, on telecommunication fees or on downloading content from other devices. The credits can be proportional to the amount of data transferred, e.g. the size of the file, or proportional to the value of the song.

The content shared by devices is verified by the server. Devices offering non-compliant, e.g. sub standard content can be excluded from the exchange based on the identification of the mobile phone identification, i.e. not satisfying the criterion in step 200 of acknowledgement.

In general, according to the present invention, a service for sanctioned P2P transfer between devices is set up. Peers or devices who want to share content are registered at the server and the content they offer may indexed, e.g. the Napster model.

The server may offer a comprehensive collection of content. This can be done using an intuitive interface for the selection of content. The offering of content can be enhanced by supporting information. If certain content is not offered by any peer (device), e.g. very new content, the server may offer the content. The latter is a temporary measure till (enough) peers (devices) offer the content. This amounts to a transition model. Initially most content may be hosted by the server but few peers will use the redirection service. If the amount of connected peers in the network grows the demand on the redirection service will increase but at the same time the amount of content provided at the server side can decrease. Hence, if the popularity (and therefore the use) of the system increases the server will not have to be scaled up.

The transfer rate of content shared by peers is not guaranteed. This enables the definition of a lazy transfer mode to offer unused bandwidth at reduced price. If the premium service of voice communication uses more of the networks bandwidth, the bandwidth available to P2P transfers is reduced.

A computer readable medium may be magnetic tape, optical disc, digital versatile disk (DVD), compact disc (CD record-able or CD write-able), mini-disc, hard disk, floppy disk, smart card, PCMCIA card, etc.

In the claims, any reference signs placed between parentheses shall not be constructed as limiting the claim. The word "comprising" does not exclude the presence of elements or steps other than those listed in a claim. The word "a" or "an" preceding an element does not exclude the presence of a plurality of such elements.

The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of peer to peer transfer of content, said method comprising the steps of:

transmitting, from a first device, a first request with a first selection criterion for a first content to a server or to a second device in a peer to peer network;

in said server, in response to receiving said first request, when said server previously has acknowledged said first device as a legal recipient of said first content:

checking if the first content satisfying said first selection criterion is available in said peer to peer network only on said server;

if so, transferring the first content to said first device, and noting that said first device subsequently has the requested first content available for other devices; and otherwise re-directing said first request to a third device on which the server knows that the requested first content is still available;

in said third device, in response to receiving said re-directed first request, transferring said first content satisfying said first selection criterion to said first device;

in said second device, in response to receiving said first request, checking if the first content satisfying said first selection criterion is available on said second device and has been supplied by said server to said second device or has been approved by said server for subsequent transfer by said second device;

if so, transferring the first content satisfying said first selection criterion to said first device, and informing the server that said first content has been transferred to said first device from said second device; and rewarding the one of said second or third device from which said first content was transferred to said first device, when content was transferred from one of these; and charging said first device for reception of said first content.

2. The method as claimed in claim 1, wherein said method further comprises the steps of:

uploading a second content satisfying a second selection criterion and the second selection criterion to the server from a fourth device; and rewarding the fourth device for uploading the second content and the second selection criterion to the server.

3. The method as claimed in claim 1, characterized in that said content is copy protected content, such as numerical information, picture, video, sound and combinations thereof.

4. The method as claimed in claim 1, characterized in that said content comprises one or more selected from the group:

a DVD picture and sound signal;

a CD sound signal;

a given digital audio format;

a given digital movie format;

a given picture format; and/or any such format that is capable of causing a device to emit a picture and/or sound signal.

5. The method as claimed in claim 1, characterized in that any of said devices is a video cassette recorder (VCR), a personal digital assistant (PDA), a mobile phone, a television, a radio, a DVD player, a CD player, an information panel, a web tablet, a smart remote, a peer or a personal computer.

6. A device comprising:

means for receiving and transmitting a first request with a first selection criterion for a first content to a server or to a second device in a peer to peer network;

means for receiving said first request (13) re-directed from said server;

means for, in response to receiving said re-directed first request, transferring the first content satisfying said first selection criterion to a first device, when said first content is available on said device, and means for informing the server that said first content has been transferred to said first device;

means for being rewarded for transfer of content; and means for being charged for reception of content.

7. The device as claimed in claim 6, wherein said device further comprises:

means for uploading a second content satisfying a second selection criterion and the second selection criterion to the server; and means for being rewarded for the upload of the second content and the second selection criterion to the server.

8. A server comprising:

means for receiving a first request with a first selection criterion for a first content;

means for, in response to receiving said first request, when said server previously has acknowledged said first device as a legal recipient of said content:

checking if the first content satisfying said first selection criterion is available in said peer to peer network on said server;

if so, transferring the first content satisfying said first selection criterion to a first device and noting that said first device subsequently has the requested first content available for other devices; and otherwise, re-directing said first request to a third device in said peer to peer network on which the server knows that the requested first content is still available;

means for being informed that said first content has been transferred to said first device from a second device;

means for rewarding the one of said second or third device from which said first content was transferred to said first device, when content was transferred from one of these; and means for charging said first device for reception of said first content.

9. The server as claimed in claim 8, wherein said server further comprises:

means for being uploaded with a second content satisfying a second selection criterion and means for being uploaded with the second selection criterion from a fourth device; and means for rewarding the fourth device for uploading the second content and the second criterion.

10. A system comprising:

means for receiving and transmitting, from a first device, a first request with a first selection criterion for a first content to a server or to a second device in a peer to peer network;

means for, in said server, in response to receiving said first request, when said server previously has acknowledged said first device as a legal recipient of said first content;

checking if the first content satisfying said first selection criterion is available in said peer to peer network only on said server;

if so, transferring the first content to said first device and noting that said first device subsequently has the requested first content available for other devices;

otherwise, re-directing said first request to a third device in said peer to peer network on which the server knows that the requested first content is still available;

means for, in said third device, in response to receiving said re-directed first request, transferring said first content satisfying said first selection criterion to said first device;

means for, in said second device, in response to receiving said first request, checking if first content satisfying said first selection criterion is available on said second device and has been supplied by said server to said second device or has been approved by said server for subsequent transfer by said second device, and if so, transferring the first content satisfying said first selection criterion to said first device, and informing the server that said first content has been transferred to said first device from said second device;

means for rewarding the one of said second or third device from which said first content was transferred to said first device, when content was transferred from one of these; and means for charging said first device for reception of said first content.

11. The system as claimed in claim 10, wherein said system further comprises:

means for uploading a second content satisfying a second selection criterion and the second selection criterion to the server from a fourth device; and means for rewarding the fourth device for uploading the second content and the second criterion to the server.

12. A computer-readable medium having stored thereon a computer program product comprising program code means for causing a computer to perform the method as claimed in claim 1 when the computer program is run on the computer.

* * * * *